US010044634B2

(12) United States Patent
Bird et al.

(10) Patent No.: US 10,044,634 B2
(45) Date of Patent: Aug. 7, 2018

(54) PACKET CAPTURE RING: RELIABLE, SCALABLE PACKET CAPTURE FOR SECURITY APPLICATIONS

(71) Applicants: International Business Machines Corporation, Armonk, NY (US); Napatech A/S, Soborg (DK)

(72) Inventors: William A. Bird, Fredericton (CA); Russell Couturier, Worcester, MA (US); Thomas D. Silliman, Leeds, MA (US); Wayne Tackabury, West Tisbury, MA (US); Alex Omo Agerholm, Hornbæk (DK); Michael Milde Lilja, Virum (DK); Peter Dahl Ekner, Hilleroed (DK); Philip Due Soeberg, Hornbæk (DK)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/225,472

(22) Filed: Aug. 1, 2016

(65) Prior Publication Data
US 2018/0034716 A1 Feb. 1, 2018

(51) Int. Cl.
*H04L 12/923* (2013.01)
*H04L 29/06* (2006.01)
(Continued)

(52) U.S. Cl.
CPC ...... *H04L 47/762* (2013.01); *H04L 29/06537* (2013.01); *H04L 43/04* (2013.01);
(Continued)

(58) Field of Classification Search
CPC ..... H04L 43/04; H04L 43/00; H04L 43/0882; H04L 49/9084; H04L 12/145;
(Continued)

(56) References Cited

U.S. PATENT DOCUMENTS

| 5,371,852 A | 12/1994 | Attanason et al. |
| 6,275,861 B1 | 8/2001 | Chaudri et al. |

(Continued)

OTHER PUBLICATIONS

Attanasio, "An Internal Tracer for CP/67", IBM Thomas J. Watson Research Center, RC2784 (1970).
(Continued)

*Primary Examiner* — Ashley Shivers
(74) *Attorney, Agent, or Firm* — Pepper Hamilton LLP

(57) ABSTRACT

Embodiments are directed to a packet capture ring that provides a single network tap for packet capture and a series of processors (or appliances) for handling serialization and search request processing in a confederated and highly scalable manner. One such appliance (a "primary" appliance) maintains a tap port to the network. Each packet capture appliance has a locally attached repository that stores raw packets and a juxtaposed index that allows for retrieval of those packets. The primary appliance sends a single copy of encapsulated packets in opposite directions around the ring to its descendants. A designation is made across the system as to a "currently designated" appliance for servicing requests for indexing and storage of captured packets. This current designation shifts from appliance to appliance in the system, as a "previously designated" appliance has its storage capacity filled.

25 Claims, 10 Drawing Sheets

(51) Int. Cl.
*H04L 12/861* (2013.01)
*H04L 12/26* (2006.01)
*H04L 12/911* (2013.01)
*H04L 12/801* (2013.01)
*H04L 12/42* (2006.01)

(52) U.S. Cl.
CPC ........ *H04L 43/0882* (2013.01); *H04L 43/106* (2013.01); *H04L 47/34* (2013.01); *H04L 47/78* (2013.01); *H04L 49/9084* (2013.01); *H04L 2012/421* (2013.01)

(58) Field of Classification Search
CPC ..... H04L 41/0896; H04L 47/76; H04L 47/78; H04L 5/1438; H04L 29/06537; H04L 47/748; H04L 69/24; H04L 12/54; H04L 2012/421; H04L 12/422; H04L 12/4637; H04L 2012/5612
See application file for complete search history.

(56) References Cited

U.S. PATENT DOCUMENTS

| | | | |
|---|---|---|---|
| 6,708,292 | B1 | 3/2004 | Mangasarian |
| 7,159,022 | B2 | 1/2007 | Printm et al. |
| 7,203,173 | B2 | 4/2007 | Bonney et al. |
| 8,010,469 | B2 | 8/2011 | Kapoor et al. |
| 8,612,570 | B1* | 12/2013 | Nair .................... H04L 41/5003 709/224 |
| 8,762,386 | B2 | 6/2014 | de la Iglesia et al. |
| 9,009,185 | B2 | 4/2015 | Bakalov |
| 2007/0036156 | A1 | 2/2007 | Liu et al. |
| 2011/0125748 | A1* | 5/2011 | Wood ................ G06F 17/30964 707/737 |
| 2011/0149959 | A1 | 6/2011 | Liu et al. |
| 2011/0219035 | A1 | 9/2011 | Korsunsky et al. |

OTHER PUBLICATIONS

Liu et al., "pMeasure: A peer-to-peer measurement infrastructure for the internet." Computer communications 29.10 (2006): 1665-1674.

Zhang, et al., "High performance packet capture on multi-core platform," Computer Science and Service System (CSSS), Nanjing, 2011, pp. 2260-2263.

Schultz, et al., "Performance Analysis of Packet Capture Methods in a 10 Gbps Virtualized Environment," 2012 21st ICCCN, Munich, 2012, pp. 1-8.

Schneider, et al., "Packet Capture in 10-Gigabit Ethernet Environments Using Contemporary Commodity Hardware," PAM 2007, LNCS 4427, pp. 207-217, 2007.

Dashtbozorgi, et. al., "A high-performance software solution for packet capture and transmission," Computer Science and Information Technology, 2009, pp. 407-411.

* cited by examiner

PACKET CAPTURE RING: RELIABLE, SCALABLE PACKET CAPTURE FOR SECURITY APPLICATIONS

BACKGROUND

Packet capture platforms generally operate as follows: packets are ingested real-time through either a network tap port being fed by an attached data center switch, or a promiscuous mode-set network adapter listening on a backbone which carries traffic of interest. Packets are stored in a locally attached repository. The local repository includes a file system that stores raw packets, as well as a juxtaposed index that allows for retrieval of those packets. The packet repository may be indexed by one or more parameters or elements. When the packet repository is filled to its capacity with raw packets, it will roll-over on the storage and write over the least recently stored packets with newly captured content. The indexes of the associated packets that have been overwritten are removed. This is therefore an inherently circular packet repository, with "circular storage sizing" over "sustained rate of captured traffic" defining a window of time that packets can be retrieved for analytics.

Packets are retrieved by a search process, initiated by an external request that uses the packet index to select packets. The retrieved packets may be assembled locally to be copied to another platform for analytics or sent via a network connection to some other requesting application.

Some traditional packet capture platforms may attach the platform to networked attached storage to extend the window of packet availability for analytics. In this case, the indexes for the remote storage are stored on the capture platform. When network attached storage fills to capacity, it will roll over and write over the least recently stored packets starting with the locally attached repository. The indexes of the associated packets that have been overwritten are also removed.

Packet capture to disk in real-time is an expensive operation and requires that the capture process is a high priority process elevated above the priority for processing of incoming search requests. This assures that all packets are written to disk with zero packet loss. When there are available resources for search, resources will be allocated to the search process to fulfill requests. A delicate balance is required to assure zero packet loss and thus search requests can be delayed for a considerable amount of time.

Retrieval speeds for packets are typically slow because resources for search can be starved by the packet capture process prioritization. Extending the packet availability window through network attached storage linearly decreases the packet retrieval speeds. On the other hand, the search process is singularly located on the capture platform and does not scale with increased storage. A typical packet retrieval request may take anywhere from 30 seconds for a very small amount of time window to hours for larger time windows at maximal capture rate and volume. The retrieval speed increases proportionately with the amount of extended storage and places further burden on a search process that is already vulnerable to resource starvation and access latency.

Another problem associated with this architecture includes latency, specifically associated with a shared network writing to shared disk repositories. The search process now competes with unknown resources for network bandwidth and controller and disk write request servicing resources. Moreover, the network path to the disk repository becomes a potential single point of failure, and the system cannot be upgraded without taking the packet capture platform off-line. Additionally, in applications involving secure packet content attribute transaction or any application deployed in a secure packet capture environment, the packets must be encrypted as they travel over a shared network.

Thus, there is a need for an improved packet capture platform to address the noted deficiencies.

SUMMARY

Embodiments are directed to a packet capture ring that provides a single network tap for packet capture and a series of processors for handling serialization and search request processing in a confederated and highly scalable manner.

In an embodiment, a computer implemented method is implemented in a system comprising a plurality of appliances arranged in a ring configuration, where each appliance is associated with a repository and an index, and where each appliance includes a plurality of network interfaces; and a network tap appliance comprising a processor and configured to receive packets from a network via a network tap. The method comprises: broadcasting, by the network tap appliance, a control protocol (CP) message to the plurality of appliances in the ring; obtaining, by the network tap appliance, a current capacity of a first repository in response to the broadcasted CP message; altering, by the network tap appliance, a packet request from the first repository in response to the current capacity; and in an event of failure to obtain, by the network tap appliance, a current capacity of a second repository, removing, by the network tap appliance, the second repository from an active packet forwarding designation list.

In additional embodiments, a computer-implemented method, a computer program product, and a system are provided for transmission of messages of a control protocol (CP) to established protocol peer appliances in a ring.

In an embodiment, the computer-implemented method is implemented in a system comprising a plurality of appliances, where each appliance is configured to listen for and process network packet traffic transmitted on a primary network, such that the traffic is destined for any listening interface on the network; where each appliance in the ring is associated with a storage repository for captured packet traffic and is associated with an index; and where each appliance includes a plurality of network interfaces used in execution of the capture processing along with processing of the CP messages; and a network tap appliance comprising a processor.

In an embodiment, the computer program product comprises a computer readable storage medium having program instructions embodied therewith, the program instructions executable by a processor.

In an embodiment, the processor executes the steps of: obtaining a current capacity of the repositories of the appliances of the ring; altering a packet storage request from an initially designated repository in response to an initially designated current capacity; and in cases of failing to obtain a second current capacity of a second repository, removing the second repository from an active packet forwarding designation list.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

According to embodiments disclosed herein, an environment for packet capture is provided. The packet capture ring described herein may be adapted for secure packet capture applications. The packet capture ring employs discrete processors (or appliances) in a tightly coupled and confederated configuration. One such appliance (a "primary" appliance) maintains a tap port or promiscuous mode listener port to the network. The primary appliance and the other non-primary appliances are in a private network bus, according to an embodiment. A designation is made across the system as to a "currently designated" appliance to be servicing requests for indexing and storage of captured packets. This current designation shifts from appliance to appliance in the system, as a "previously designated" appliance has its storage capacity filled.

Figure 1:
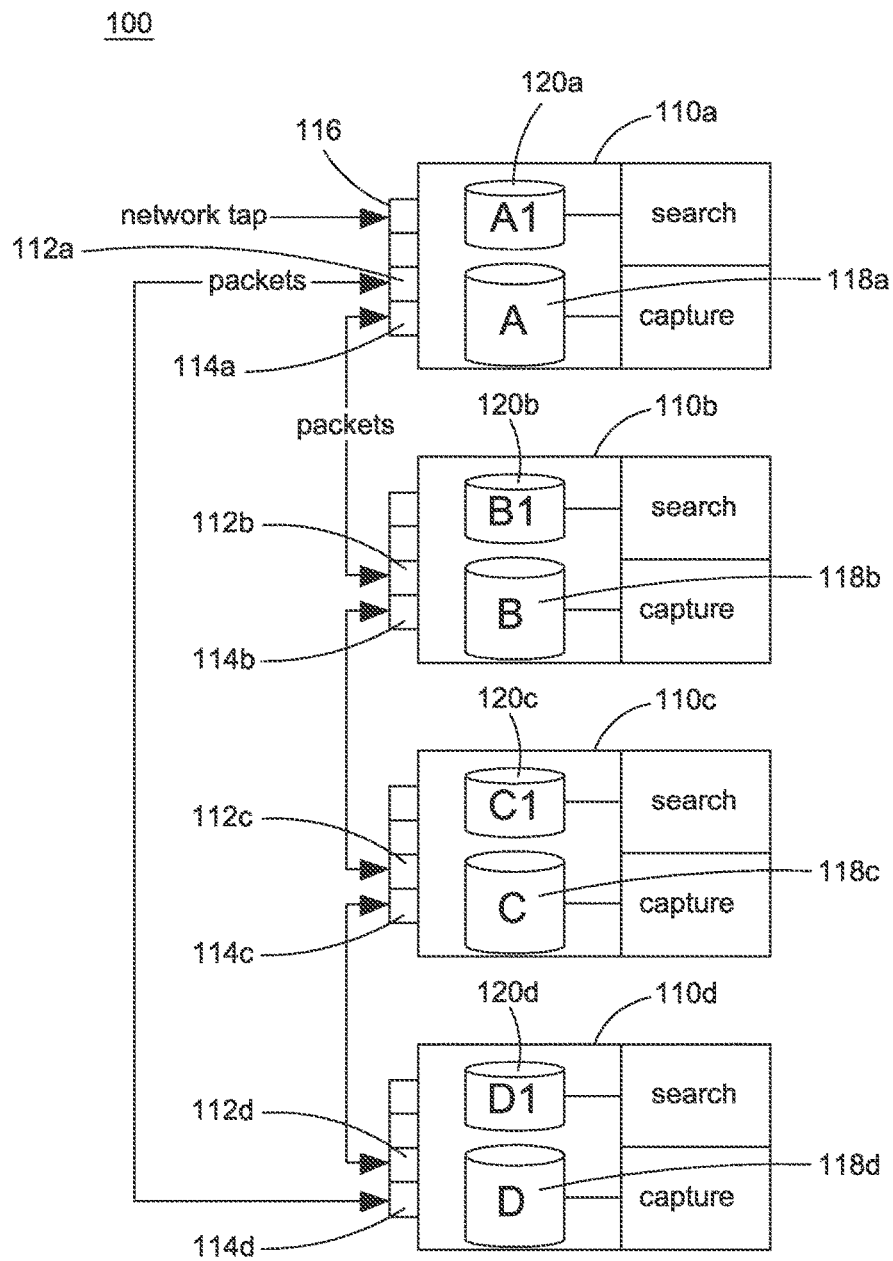
FIG. 1 is a diagram depicting a packet capture ring, according to embodiments herein.

FIG. 1 is a diagram depicting a packet capture ring 100, according to embodiments provided herein. As shown in FIG. 1, the packet capture ring 100 is comprised of a plurality of packet capture appliances 110a-110d, one of which is a network tap appliance (i.e., the primary appliance), in a full duplex ring. In the embodiment shown in FIG. 1, the packet capture appliance 110a is the network tap appliance of the packet capture ring 100, and there are four total packet capture appliances, 110a-110d. This is just one example configuration, and fewer or additional packet capture appliances 110 may be added.

Each packet capture appliance 110 has two network interfaces 112 and 114. Each appliance 110 is networked to its successor and dependent (i.e., "descendants") using the two network interfaces 112 and 114. The network tap appliance 110a (i.e., the packet capture appliance 110a in the embodiment shown in FIG. 1) has an additional interface 116 for ingesting packets from the network tap.

Each packet capture appliance 110 has a locally attached repository 118 that stores raw packets and a juxtaposed index 120 that allows for retrieval of those packets. The packet repository 118 may be indexed by one or more of a timestamp, internet protocol (IP) addresses, medium access control (MAC) addresses, and ports associated with transmission control protocol (TCP) and user datagram protocol (UDP) flows. Other elements for indexing may also be added, such as a virtual local area network (VLAN) ID or encapsulation methodology. The elements may vary depending on, for example, a vendor.

According to an embodiment, the network tap appliance 110a ingests packets and sends a single copy of encapsulated packets in opposite directions around the ring 100 to its descendants (i.e., packet capture appliances 110b and 110d). According to an embodiment, the encapsulation includes a timestamp as observed and marked by the network tap appliance 110a and used by the subsequent appliances 110 as the timestamp of reference. The encapsulation also includes a forward header that designates the appliance 110 that is currently responsible for storing and indexing the packets (i.e., the active appliance), as further described herein.

Each appliance 110 receives two copies of the packets, with the latter arriving packet being ignored through a de-duplication process. This assures that two independent paths are always viable for each appliance 110 regardless of failures in the system 100. The packet capture appliances 110 store packets in a linear time-based fashion. When repository 118a fills to capacity in the first appliance 110a, repository 118b of the second appliance 110b is filled, and this is repeated until repository 118d of the final appliance 110d is filled. Once the final repository 118d is filled, the system 100 rolls-over to the first appliance 110a and the least recently stored packets are written over with newly captured content. The indexes of the associated packets that have been overwritten are accordingly removed. This scenario is possible because each packet capture appliance 110 has real-time access to any captured packet with the encapsulated timestamp and designation header. The forward header designates which is the active appliance 110 for packet storage.

Each appliance repository 118 has a time window segment of the contiguous packet stream with a juxtaposed index, as shown below in Table 1. This segmentation of time by appliance 110 has significant positive implications for large packet retrievals, as described herein.

TABLE 1

| Appliance | Time Window Segment | Packet Repository | Index |
|---|---|---|---|
| 110a | $T^1$ to $T^2$ | 118a | 120a |
| 110b | $T^{2!}$ to $T^3$ | 118b | 120b |
| 110c | $T^{3!}$ to $T^4$ | 118c | 120c |
| 110d | $T^{4!}$ to $T^5$ | 118d | 120d |

According to an embodiment, a control protocol (CP) to manage the repositories 118, the forwarding of appliance designations, and multiple failure scenarios, between all appliances 110 of the ring 100, is provided. According to embodiments, the CP facilitates an ability to broadcast the desired fill level to all appliances 110 in the ring 100 from the network tap appliance 110a; an ability of the packet capture appliances 110 to broadcast their percent full level to all appliances 110 in the ring 100; an ability to broadcast any failures detected by neighbor appliances 110 due to link failures; and an ability of the appliances 110 to broadcast a heartbeat message containing an appliance identifier. The CP advantageously allows for the ability to do quick broadcast for desired storage saturation levels, and the ability of the non-primary appliances 110 to adjust for future packet storage as those appliances 110 become designated.

The network tap appliance 110a (i.e., the primary appliance) coordinates packet storage activity, and accordingly periodically broadcasts a CP message to all appliances 110 in the ring 100 containing a desired percent fill level of repositories 118. This directs the capacity fill level of each respective packet repository 118, enabling the ability for a packet capture appliance 110 to broadcast via the CP current percent filled level as it is storing packets to signal the network tap appliance 110a to change the forwarding designation; and the ability for the network tap appliance 110a to effectively increase the search and packet retrieval speed by directing the maintenance of smaller packet repositories (explained in further detail below).

The network tap appliance 110a listens for CP broadcast messages from the other appliances 110b-110d for several determinations: for link failures to determine if a connection is down or system is powered off; for heartbeat failures to determine operating system, application, or disk failures; and for percent full messages to determine when to change the forwarding designation to the next appliance 110.

The network tap appliance 110a ingests de-duplicated packets and initially designates itself as the active appliance 110. It records the packets with associated indices as previously described.

The network tap appliance 110a then encapsulates packets with the originally observed timestamp and forwarding designation header. In this case, at a point of stack resource "full availability," it references itself.

When the network tap appliance 110a reaches the desired percent capacity, it simply stops storing packets and changes the forwarding designation. The next appliance 110 (e.g., 110b) becomes active and broadcasts a current percent filled level message, while storing and indexing packets. The master network tap appliance 110a is aware of the repository capacity through broadcast messages and simply changes the forwarding designation at the appropriate time.

This is repeated with each appliance 110 until the entire system "rolls over"—signaling full usage of appliance repositories 118a-118d-and stores new packets at the least-recently used appliance 110 and repository 118 (presumably 110a and 118a in this description).

Figure 2:
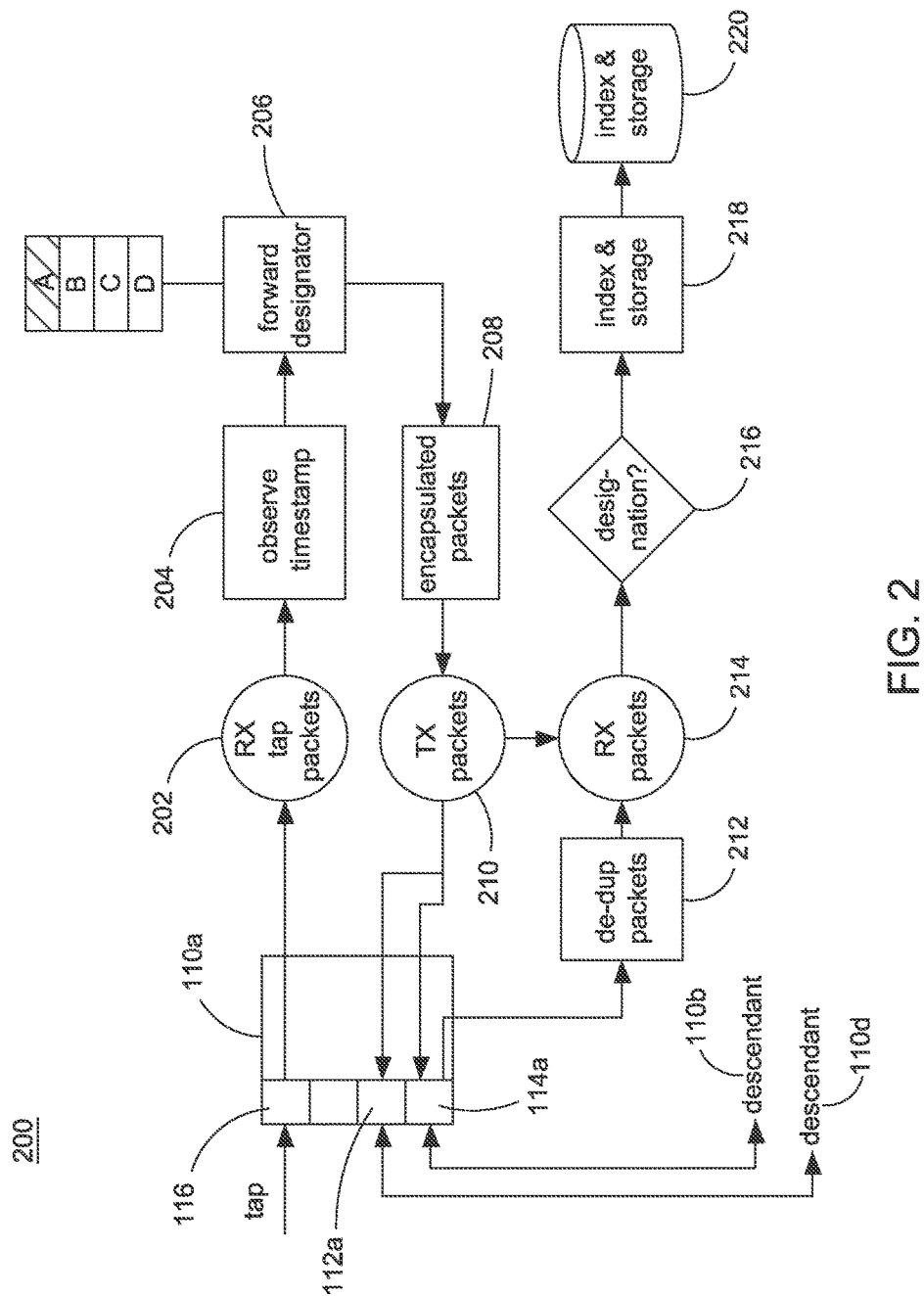
FIG. 2 is a data flow diagram depicting data flow related to a network tap appliance, according to embodiments herein.

According to embodiments, and with reference to FIG. 2, a data flow 200 related to the network tap appliance 110a, is provided. At 202, through the network tap 116, the network tap appliance 110a receives packets. At 204, a timestamp of receipt of a packet is observed; and at 206, the forward designator is noted.

At 208, the packet is encapsulated, and at 210/214, the encapsulated packet is transmitted and received at the network tap appliance 110a to avoid sending packets to be stored on the network tap appliance 110a around the ring 100 before storing them. Encapsulated packets are also transmitted (at 210) via the network interfaces 112a and 114a of the network tap appliance 110a to its descendants 110b and 110d.

When receiving packets, as previously discussed, duplicate packets are received at ports 112a and 114a, and at 212 a de-duplication process is performed. At 214, the packets are received by the network tap appliance 110a. At 216, a determination as to the designation is made (i.e., the timestamp and the forwarding designation header). At 218, indexing and storage operations are initiated, with 220 indicating the indexed and stored packets at the repository 118a of the network tap appliance 110a.

Figure 3:
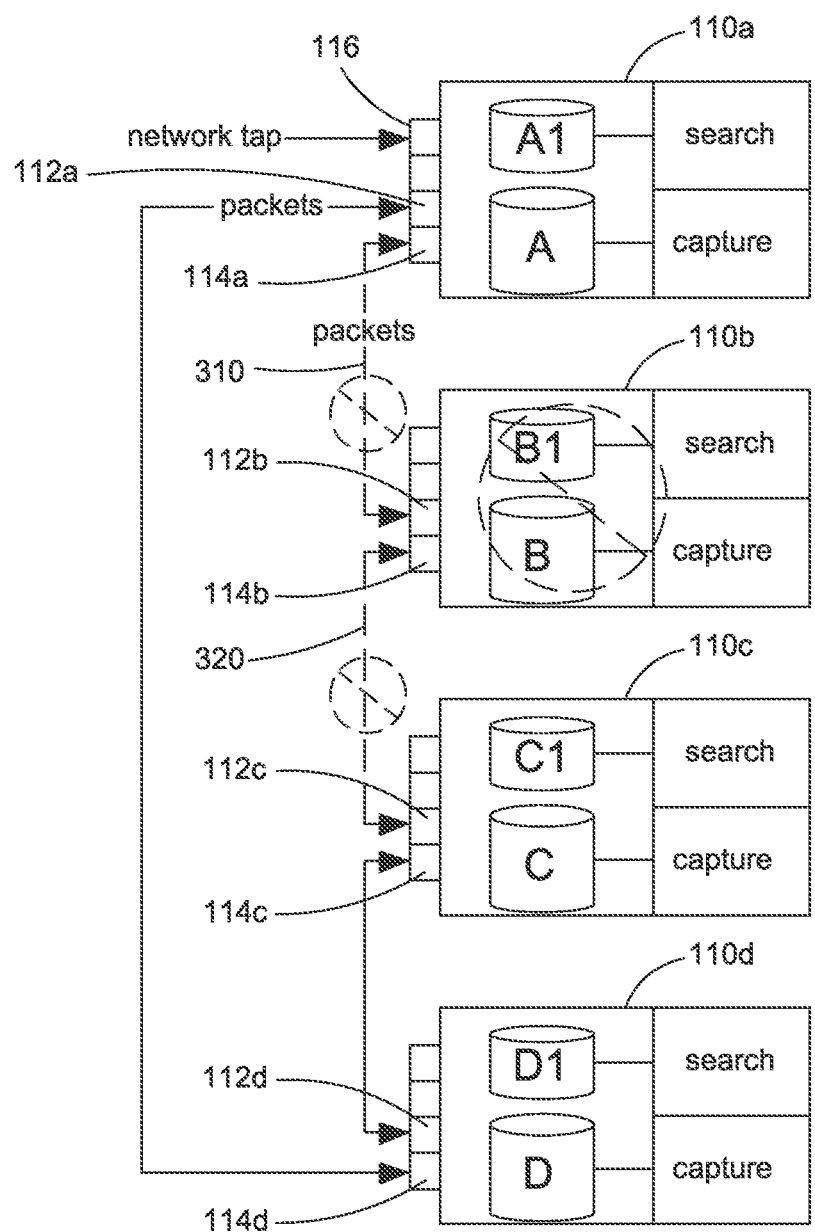
FIG. 3 is a diagram depicting fault tolerance aspects of a packet capture ring, according to an embodiment.

With reference to FIG. 3, a diagram 300 depicting fault tolerance aspects of a packet capture ring 100, according to an embodiment, is provided.

According to an embodiment, a packet capture appliance 110 is considered unusable if it receives any of the following broadcast messages: 1) a neighbor appliance 110 observes that the link is down; or 2) the absence of a heartbeat from the packet capture appliance 110. The network tap appliance 110a removes the failed appliance 110 from the active forwarding designation list until it observes a new heartbeat message from the packet capture appliance 110. The appliance 110 is skipped as a forwarding designation and packets are routed through the remaining connections.

As shown in FIG. 3, packet capture appliance 110b is a failed appliance, with links 310 and 320 not in use as the failed appliance 110b is temporarily removed from service of the ring 100.

With respect to fault recovery, when a valid appliance 110 is inserted back in the network ring 100, the network tap appliance 110a recognizes the heartbeat messages and inserts the respective appliance 110 back into the valid forwarding designation list. If the system can be recovered prior to the appliance 110 missing itself as the contiguous designation, no packets in the associated repository 118 will be lost. If the appliance 110 is "lapped" or bypassed and misses its slot in the forwarding designation round-robin, all packets in the associated repository 118 will be considered non-searchable and obsolete. If the system (i.e., appliance 110) failed while acting as an active repository 118, all packets will be reserved when the appliance 110 is recovered if it does not miss a contiguous designation.

Figure 4A:
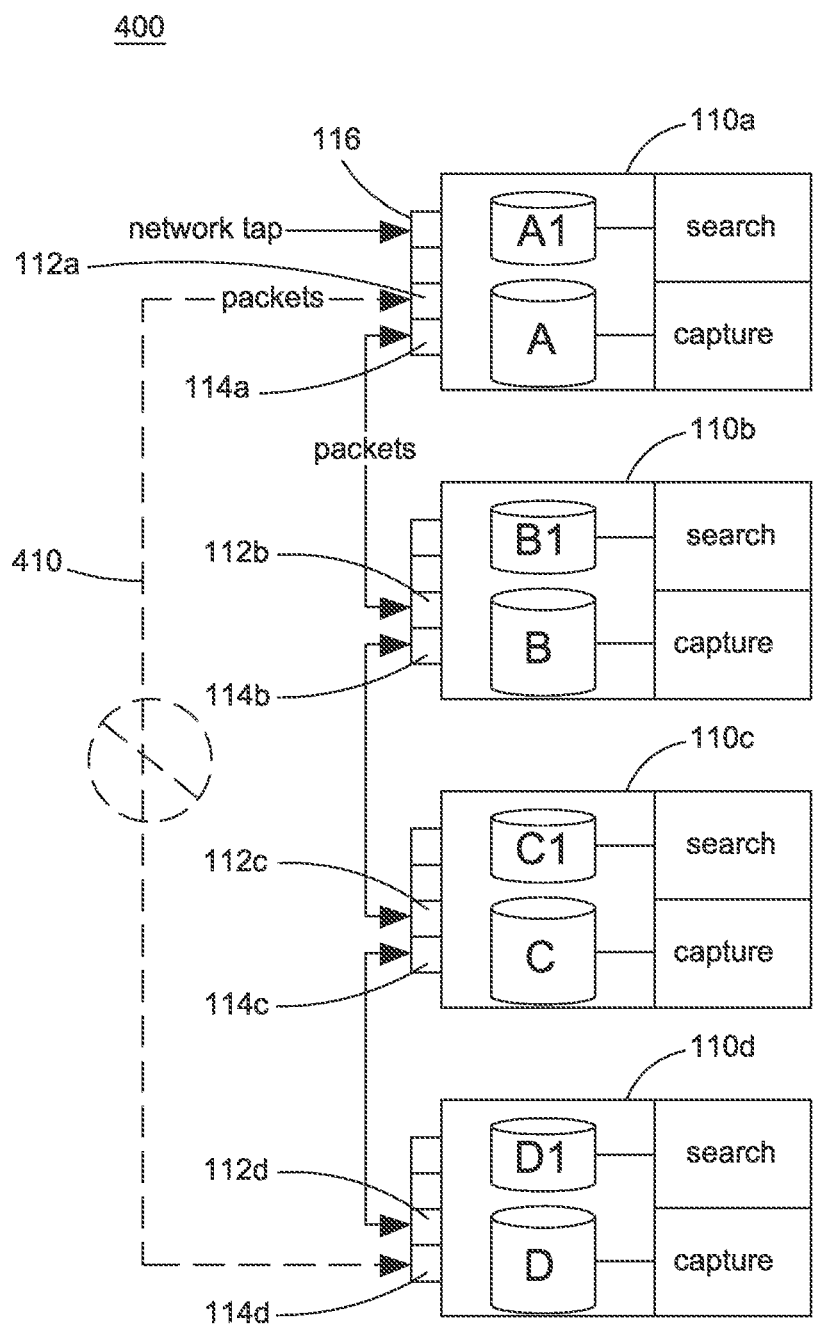
FIGS. 4A and 4B are diagrams depicting a packet capture ring being upgraded, according to an embodiment.
Figure 4B:
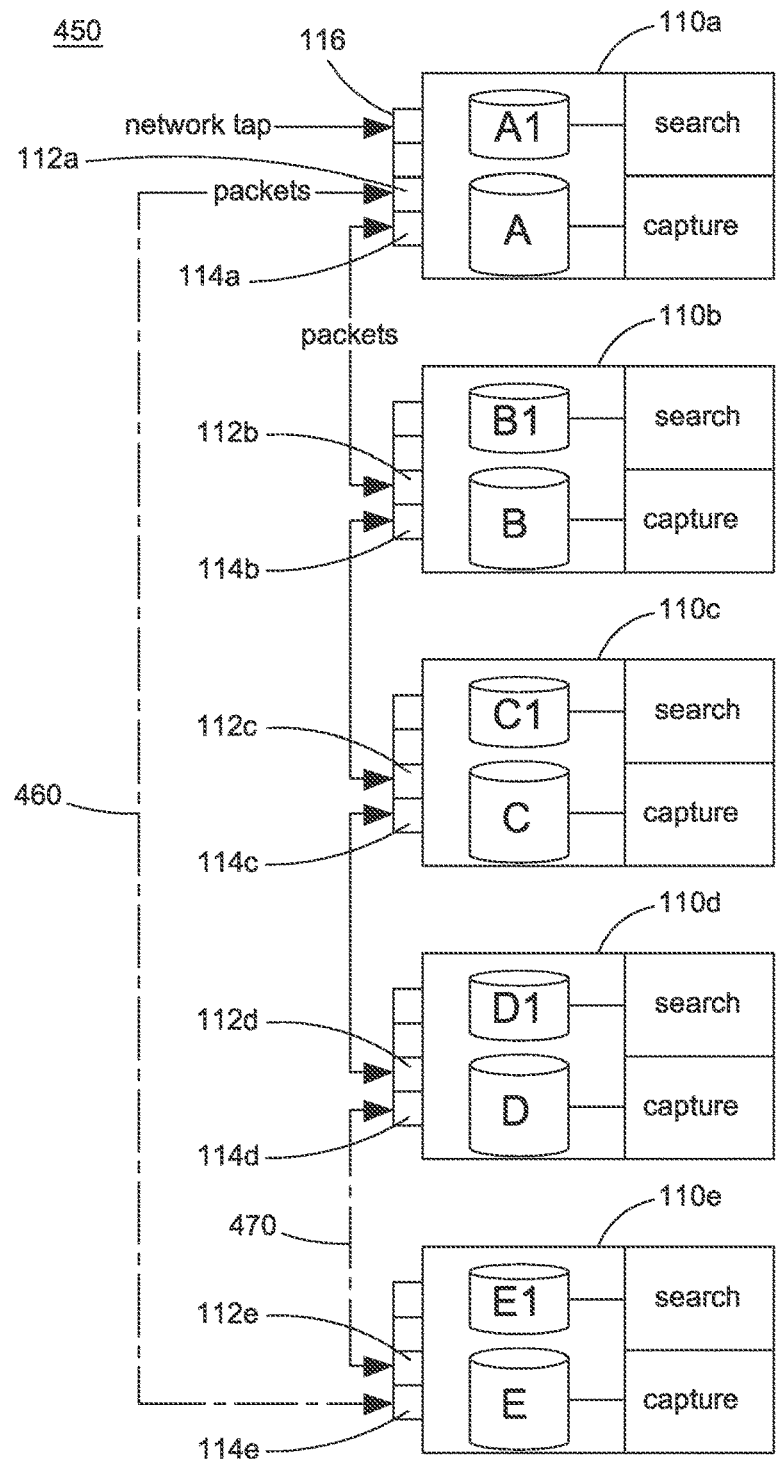

FIGS. 4A and 4B are diagrams 400 and 450, respectively, depicting a packet capture ring 100 being upgraded, according to an embodiment. In an embodiment, the upgrade is done in real-time. The ability to administratively take offline and automatically recover an appliance 110 enables operating systems, applications, and hardware to be upgraded without taking the systems down. Packet ingestion, storage, and indexing are maintained while the system can be sequentially upgraded. New appliances can also be added to the network in real-time.

As shown in diagram 400 of FIG. 4A, the link 410, linking network tap appliance 110a and packet capture appliance 110d, is broken. As shown in diagram 450 of FIG. 4B, new packet capture appliance 110e is added; packet capture appliances 110d and 110e are connected via link 470; and packet capture appliance 110e is connected to the network tap appliance 110a through link 460. The network tap appliance 110a recognizes the heartbeat messages of the new appliance 110e and inserts the respective forwarding designation into the valid list. According to an embodiment, administrative procedures for the system 100 allow for indication of orderly transition to offline and allow CP operations to indicate such a directed offline state to be pending, with "hot handoff" of any active forwarding designation state on the part of the appliance being taken offline.

As discussed above, packet capture environments consistent with current art, that extend storage through networked attached repositories, suffer from lack of critical shared low priority CPU resources of a single appliance to retrieve packets of interest. The search latency increases linearly with the amount of storage. This becomes untenable for large inquiries, significantly reducing the practicality of retaining the data. However, a ring-based methodology, as provided by embodiments herein, for staking packet capture appliances 110 assures that an increase in storage is aligned with a significant increase in respective CPU resources for searching. It also assures that parallel searches can be conducted and the search results concatenated instantaneously by appending the search results (as shown in FIG. 5).

Figure 5:
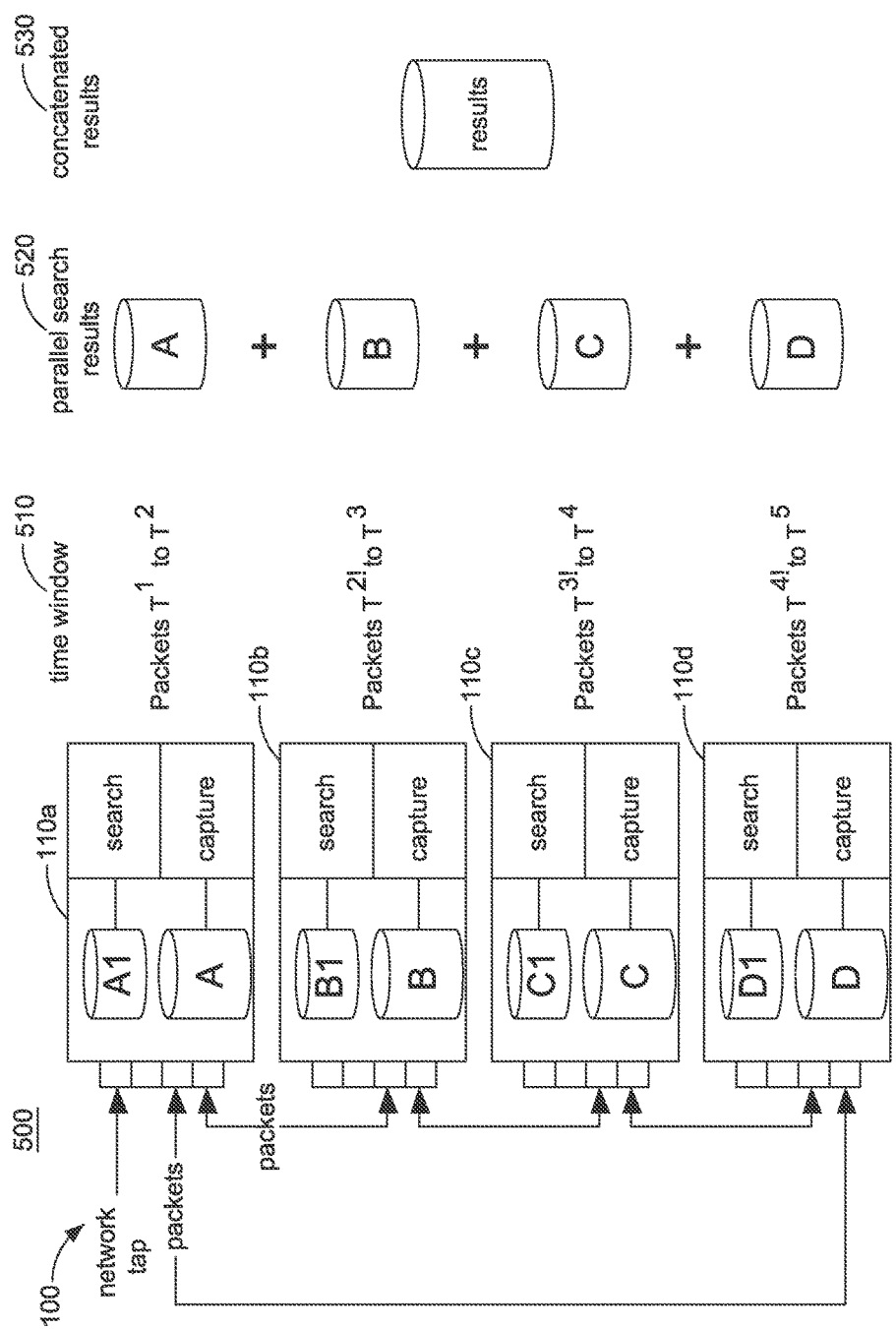
FIG. 5 is a diagram illustrating search and packet retrieval aspects of a packet capture ring, according to embodiments.

FIG. 5 is a diagram 500 illustrating search and packet retrieval aspects of a packet capture ring 100, according to embodiments, that reflects the search and packet retrieval parallelism. As shown in FIG. 5, each packet capture appliance 110 has a time window 510 in which packets are stored. Parallel search results 520 can be conducted, and the search results can be concatenated 530.

The following steps reflect an example of the search results capabilities of the ring 100:

1. A query is requested by a third party application and sent simultaneously via CP to all appliances 110; "all packets that have a server IP address of 128.234.56.8 and a server port of 773" is an example query.

2. Each appliance 110 searches its respective repository 118 using the associated index 120 and returns results for the window of time that it retains.

3. Since time is contiguous from one appliance to the next, the results can be merged by simply concatenating the individual search result sets.

At any time, according to embodiments herein, all but the appliance 110 that is currently responsible for the capture can supply 100 percent of the respective resources for searching.

Figure 6:
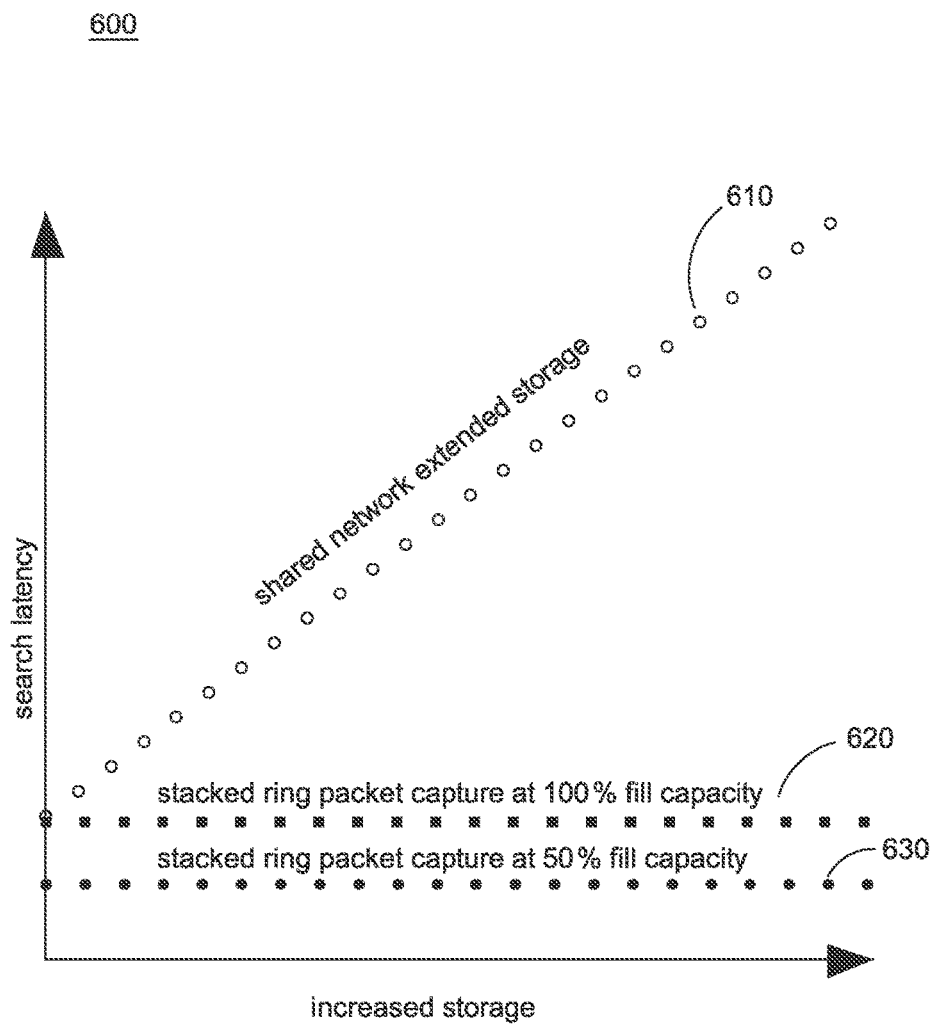
FIG. 6 is a chart illustrating search latency and storage characteristics of a packet capture ring, according to embodiments.

FIG. 6 is a chart 600 illustrating search latency and storage characteristics of a packet capture ring 100, according to embodiments. FIG. 6 illustrates the worst scenario for search retrieval speeds of the methodology according to embodiments provided herein (620, stacked ring packet capture at 100% fill capacity) versus typical shared network extended storage methodologies (610, shared network extended storage). 630, stacked ring packet capture at 50% fill capacity, is also shown. As can be seen, search latency does not increase as storage is added because of the parallel search capability. In fact, the search results can be infinitely tuned by lowering the fill capacity. In the example shown in FIG. 6, lowering the fill capacity to 50%, reduces the search latency by 50% as only half as many packets must be searched and retrieved.

Figure 7:
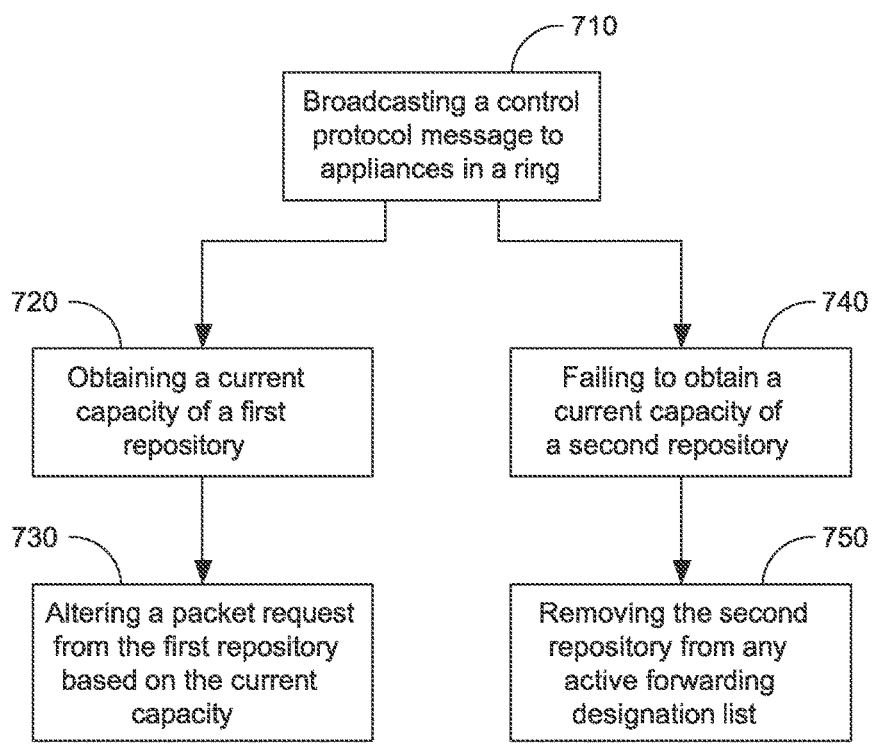
FIG. 7 is a flowchart illustrating a method of implementing a packet capture ring, according to an embodiment.

FIG. 7 is a flowchart 700 illustrating a method of implementing a packet capture ring 100, according to an embodiment.

At 710, the network tap appliance 110a broadcasts CP messages to the appliances 110 in the ring 100.

At 720, a current capacity of a first repository 118 (e.g., the repository 118b of the appliance 110b) is received. If the current capacity of the first repository 118 is equal to a capacity limit, or if the current capacity is nearing a capacity limit, then at 730 the network tap appliance 110a alters a packet request from the first repository 118. The next repository (e.g., the repository 118c of the appliance 110c) may then be designated as the active repository on the forwarding designation list.

At 740, following the broadcasting of the CP messages to the appliances 110, the network tap appliance 110a may, in some instances, fail to obtain a current capacity of one or more repositories (e.g., a second repository, the repository 118c of the appliance 110c). If this occurs, then at 750, the second repository 118 is removed from the active forwarding designation list. The second repository 118 may be re-inserted into the active forwarding designation list following receipt of a heartbeat from the associated appliance 110.

Figure 8:
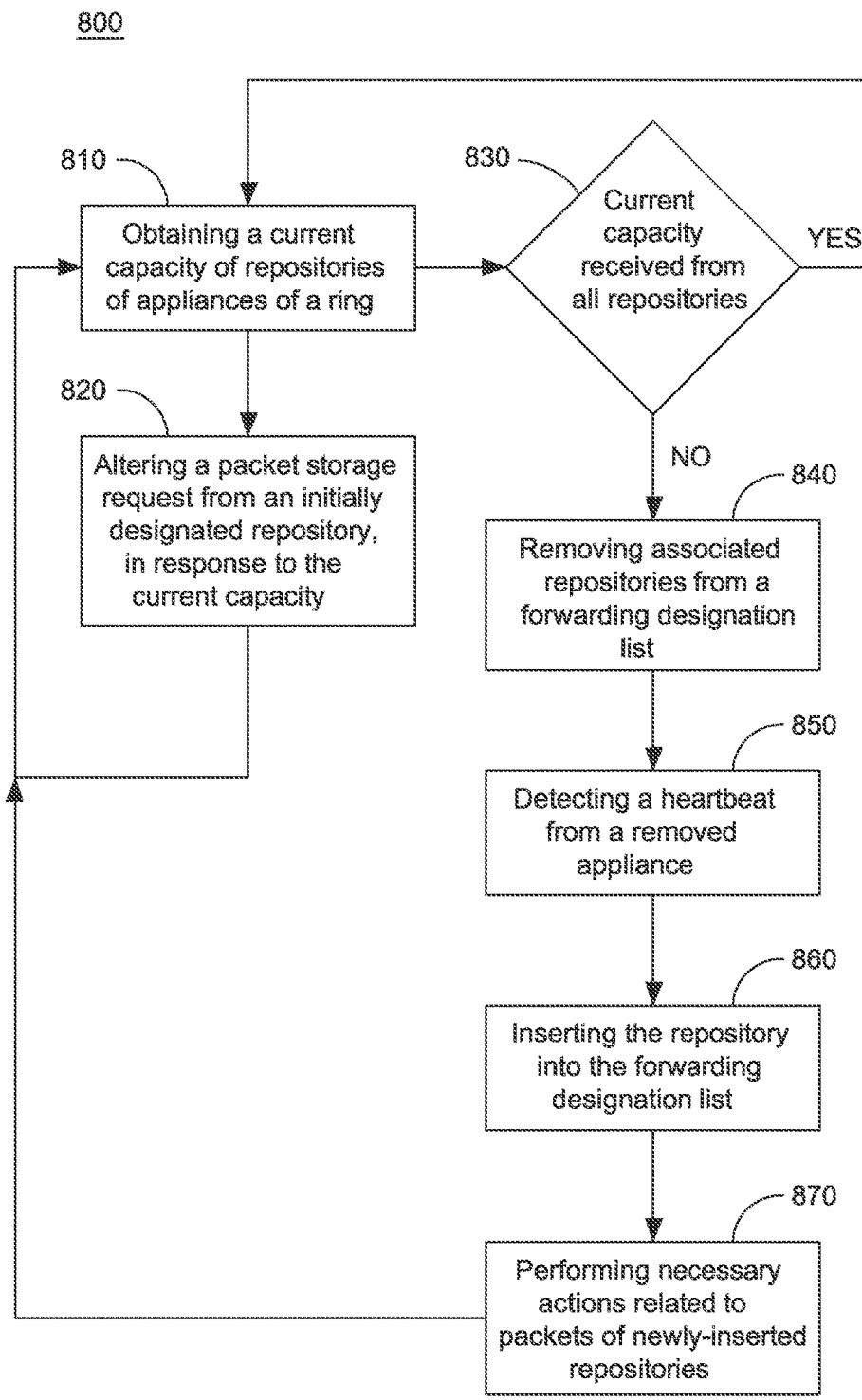
FIG. 8 is a flowchart illustrating a method of transmitting messages of a control protocol to packet capture appliances in a ring configuration, according to another embodiment.

FIG. 8 is a flowchart 800 illustrating a method of transmitting messages of a CP to packet capture appliances 110 in a ring configuration 100, according to another embodiment.

At 810, current capacities of the repositories 118 of the appliances 110 of the ring are obtained by the network tap appliance 110a. At 820, a packet storage request from an initially-designated repository 118 is altered, in response to the current capacity of the initially-designated repository 118. 810 and 820 may be repeated to ensure that packets are being stored in a repository 118 with sufficient capacity.

At 830, a determination may be made as to if the current capacity has been received from all repositories 118/appliances 110. If yes, then 810, 820, and 830 may be repeated to ensure that packets are being stored in a repository 118 with sufficient capacity and to ensure that no appliances 110 are offline.

If, however, the determination at 830 is no (i.e., the current capacity has not been received from all repositories 118/appliances 110), then at 840 the associated repositories 118 are removed from the forwarding designation list.

At 850, a heartbeat may be detected from an appliance 110 whose repository 118 was removed from the forwarding designation list. Upon this detection, at 860, the removed repository 118 is inserted into the forwarding designation list.

At 870, necessary actions are performed on the packets stored in the newly-inserted repository. For example, as described in detail above with respect to fault recovery aspects of the ring 100, if the appliance 110 is recovered prior to the appliance 110 missing itself as the contiguous designation, no packets in the associated repository 118 will be lost. If, however, the appliance 110 is "lapped" or bypassed and misses its slot in the forwarding designation round-robin, all packets in the associated repository 118 are considered non-searchable and obsolete. If the appliance 110 failed while acting as an active repository 118, all packets are reserved when the appliance 110 is recovered if it does not miss a contiguous designation.

Secure packet capture applications have a plurality of requirements with associated operational incentives. The packet capture ring 100 described herein addresses these requirements, as described below.

One requirement is continual availability; secure packet capture demands an absolute minimization of missed captured packets owing to component or other subsystem failures. The packet capture ring 100 incorporates fault tolerance and fast switchover capabilities.

Another requirement is an ability to accommodate long retention periods; since packets may be captured as supporting evidence to any detected network security offense, systems must offer storage matching a suitably long window for post-attack detection and evidence collection. According to embodiments provided herein, the packet capture ring 100 provides deep horizontal scalability in its subcomponent configuration. The ring buffering nature of storage allows for automatic delineation and maintenance of retention period.

Another requirement is the security of transferred and persisted packets; packet content cannot be exposed in clear text on shared network media, and real-time performance considerations are not well served by encryption/decryption overhead. The packet capture ring 100 provides a private network over which packets are transferred, thus avoiding opportunities for data loss and snooping.

Speed of searching is an additional requirement; there is need for searches for related packets and patterns with a high degree of urgency. The packet capture ring 100 provides for linearly parallelized searching, which provides bounded times for processing and fulfillment of search and query requests.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
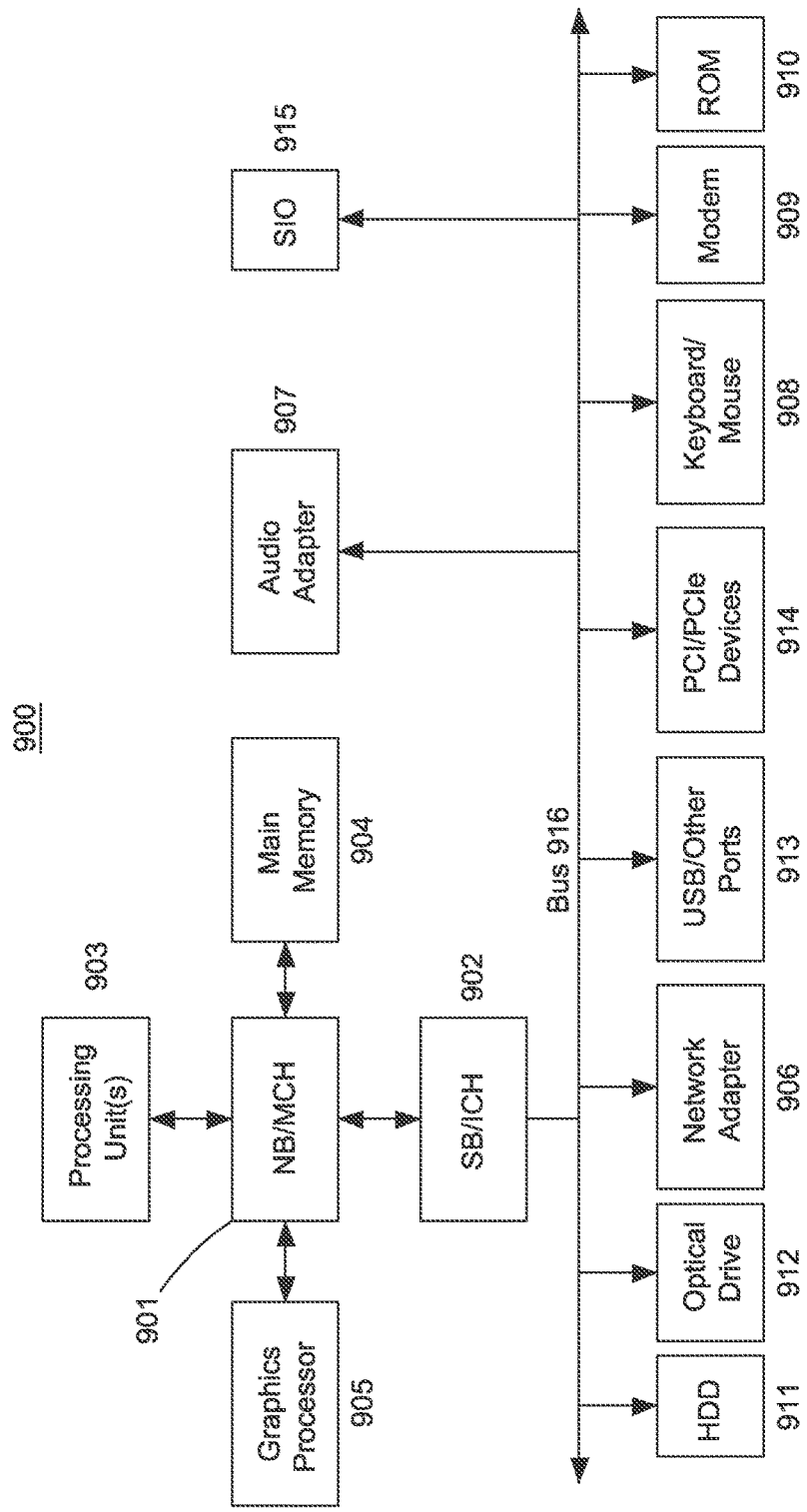
FIG. 9 is a block diagram of an example data processing system in which aspects of the illustrative embodiments are implemented.

FIG. 9 is a block diagram of an example data processing system 900 in which aspects of the illustrative embodiments are implemented. Data processing system 900 is an example of a computer, such as a server or client, in which computer usable code or instructions implementing the process for illustrative embodiments of the present invention are located. In one embodiment, FIG. 9 may represent a server computing device.

In the depicted example, data processing system 900 can employ a hub architecture including a north bridge and memory controller hub (NB/MCH) 901 and south bridge and input/output (I/O) controller hub (SB/ICH) 902. Processing unit 903, main memory 904, and graphics processor 905 can be connected to the NB/MCH 901. Graphics processor 905 can be connected to the NB/MCH 901 through, for example, an accelerated graphics port (AGP).

In the depicted example, a network adapter 906 connects to the SB/ICH 902. An audio adapter 907, keyboard and mouse adapter 908, modem 909, read only memory (ROM) 910, hard disk drive (HDD) 911, optical drive (e.g., CD or DVD) 912, universal serial bus (USB) ports and other communication ports 913, and PCI/PCIe devices 914 may connect to the SB/ICH 902 through bus system 916. PCI/PCIe devices 914 may include Ethernet adapters, add-in cards, and PC cards for notebook computers. ROM 910 may be, for example, a flash basic input/output system (BIOS). The HDD 911 and optical drive 912 can use an integrated drive electronics (IDE) or serial advanced technology attachment (SATA) interface. A super I/O (SIO) device 915 can be connected to the SB/ICH 902.

An operating system can run on processing unit 903. The operating system can coordinate and provide control of various components within the data processing system 900. As a client, the operating system can be a commercially available operating system. An object-oriented programming system, such as the Java programming system, may run in conjunction with the operating system and provide calls to the operating system from the object-oriented programs or applications executing on the data processing system 900. As a server, the data processing system 900 can be an IBM® eServer™ System p® running the Advanced Interactive Executive operating system or the Linux operating system. The data processing system 900 can be a symmetric multiprocessor (SMP) system that can include a plurality of processors in the processing unit 903. Alternatively, a single processor system may be employed.

Instructions for the operating system, the object-oriented programming system, and applications or programs are located on storage devices, such as the HDD 911, and are loaded into the main memory 904 for execution by the processing unit 903. The processes for embodiments described herein can be performed by the processing unit 903 using computer usable program code, which can be located in a memory such as, for example, main memory 904, ROM 910, or in one or more peripheral devices.

A bus system 916 can be comprised of one or more busses. The bus system 916 can be implemented using any type of communication fabric or architecture that can provide for a transfer of data between different components or devices attached to the fabric or architecture. A communication unit such as the modem 909 or the network adapter 906 can include one or more devices that can be used to transmit and receive data.

Those of ordinary skill in the art will appreciate that the hardware depicted in FIG. 9 may vary depending on the implementation. Other internal hardware or peripheral devices, such as flash memory, equivalent non-volatile memory, or optical disk drives may be used in addition to or in place of the hardware depicted. Moreover, the data processing system 900 can take the form of any of a number of different data processing systems, including but not limited to, client computing devices, server computing devices, tablet computers, laptop computers, telephone or other communication devices, personal digital assistants, and the like. Essentially, data processing system 900 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method comprising:
broadcasting, by a network tap appliance comprising a processor and configured to receive packets, a control protocol (CP) message to a plurality of appliances in a ring, the network tap appliance included in the plurality of appliances, wherein each appliance is associated with a repository and an index, and wherein each appliance includes a plurality of network interfaces;
obtaining, by the network tap appliance, a current capacity of a first repository in response to the broadcasted CP message;
altering, by the network tap appliance, a packet request from the first repository in response to the current capacity; and
in an event of failure to obtain, by the network tap appliance, a current capacity of a second repository, removing, by the network tap appliance, the second repository from an active packet forwarding designation list.

2. The method of claim 1, wherein altering the packet request from the first repository is based on the current capacity of the first repository being equal to or approaching within a predetermined amount a capacity limit.

3. The method of claim 1, further comprising:
designating, by the network tap appliance, a next repository as an active repository on the active packet forwarding designation list.

4. The method of claim 1, further comprising:
re-inserting, by the network tap appliance, the second repository into the active forwarding designation list following receipt of a heartbeat from an associated appliance.

5. The method of claim 1, further comprising:
sending, by the network tap appliance, a single copy of encapsulated packets in opposite directions around the ring to descendant appliances, the encapsulation comprising a timestamp as observed and marked by the network tap appliance and a forward header that designates an active appliance.

6. A system for packet capture and search, the system comprising:
a plurality of appliances arranged in a ring configuration, wherein each appliance is associated with a repository and an index, and wherein each appliance includes a plurality of network interfaces; and
a network tap appliance comprising a processor and configured to receive packets from a network via a network tap, the network tap appliance further configured to:
broadcast a control protocol (CP) message to the plurality of appliances in the ring;
obtain a current capacity of a first repository in response to the broadcasted CP message;
alter a packet request from the first repository in response to the current capacity; and
failing to obtain a current capacity of a second repository, remove the second repository from an active packet forwarding designation list.

7. The system of claim 6, wherein altering the packet request from the first repository is based on the current capacity of the first repository being equal to or approaching within a predetermined amount a capacity limit.

8. The system of claim 6, wherein the network tap appliance is further configured to:
designate a next repository as an active repository on the active packet forwarding designation list.

9. The system of claim 6, wherein the network tap appliance is further configured to:
re-insert the second repository into the active forwarding designation list following receipt of a heartbeat from an associated appliance.

10. The system of claim 6, wherein the network tap appliance is further configured to:

send a single copy of encapsulated packets in opposite directions around the ring to descendant appliances, the encapsulation comprising a timestamp as observed and marked by the network tap appliance and a forward header that designates an active appliance.

11. A computer implemented method for transmission of messages of a control protocol (CP) to established protocol peer appliances in a ring, wherein each appliance is configured to listen for and process network packet traffic transmitted on a primary network, such that the traffic is destined for any listening interface on the network; wherein each appliance in the ring is associated with a storage repository for captured packet traffic and is associated with an index; and wherein each appliance includes a plurality of network interfaces used in execution of the capture processing along with processing of the CP messages; the method comprising:
obtaining, by a network tap appliance comprising a processor and configured to initially receive the network packet traffic via a network tap, a current capacity of the repositories of the appliances of the ring;
altering, by the network tap appliance, a packet storage request from an initially designated repository in response to an initially designated current capacity; and
in cases of failing to obtain a second current capacity of a second repository, removing, by the network tap appliance, the second repository from an active packet forwarding designation list.

12. The method of claim 11, further comprising:
re-inserting, by the network tap appliance, the second repository into the active forwarding designation list following receipt of a heartbeat from an associated appliance.

13. The method of claim 12, further comprising:
performing, by the network tap appliance, packet processing on packets stored in the second repository upon re-insertion of the second repository into the active forwarding designation list.

14. The method of claim 11, further comprising:
breaking, by the network tap appliance, a link between the network tap appliance and a last appliance of the ring;
linking, by the network tap appliance, a new appliance with the network tap appliance and the last appliance between respective ones of the plurality of network interfaces; and
inserting, by the network tap appliance, a respective forwarding designation of the new appliance into the active packet forwarding designation list.

15. The method of claim 11, further comprising:
transmitting, by the network tap appliance, a CP search message to the appliances of the ring;
receiving, by the network tap appliance, relevant results from one or more of the appliances of the ring for a respective window of time retained by a respective one of the one or more of the appliances; and
merging, by the network tap appliance, the received relevant results by concatenating each of the relevant results.

16. A computer program product for transmission of messages of a control protocol (CP) to established protocol peer appliances in a ring, wherein each appliance is configured to listen for and process network packet traffic transmitted on a primary network, such that the traffic is destined for any listening interface on the network; wherein each appliance in the ring is associated with a storage repository for captured packet traffic and is associated with an index; and wherein each appliance includes a plurality of network interfaces used in execution of the capture processing along with processing of the CP messages; the computer program product comprising a computer readable storage medium having program instructions embodied therewith, the program instructions executable by a processor that is part of a network tap appliance to cause the processor to:
- obtain a current capacity of the repositories of the appliances of the ring;
- alter a packet storage request from an initially designated repository in response to an initially designated current capacity; and
- in cases of failing to obtain a second current capacity of a second repository, remove the second repository from an active packet forwarding designation list.

17. The computer program product of claim 16, wherein the program instructions further cause the processor to:
- re-insert the second repository into the active forwarding designation list following receipt of a heartbeat from an associated appliance.

18. The computer program product of claim 17, wherein the program instructions further cause the processor to:
- perform packet processing on packets stored in the second repository upon re-insertion of the second repository into the active forwarding designation list.

19. The computer program product of claim 16, wherein the program instructions further cause the processor to:
- break a link between the network tap appliance and a last appliance of the ring;
- link a new appliance with the network tap appliance and the last appliance between respective ones of the plurality of network interfaces; and
- insert a respective forwarding designation of the new appliance into the active packet forwarding designation list.

20. The computer program product of claim 16, wherein the program instructions further cause the processor to:
- transmit a CP search message to the appliances of the ring;
- receive relevant results from one or more of the appliances of the ring for a respective window of time retained by a respective one of the one or more of the appliances; and
- merge the received relevant results by concatenating each of the relevant results.

21. A system for transmission of messages of a control protocol (CP) to established protocol peer appliances in a ring, the system comprising:
- a plurality of appliances, wherein each appliance is configured to listen for and process network packet traffic transmitted on a primary network, such that the traffic is destined for any listening interface on the network; wherein each appliance in the ring is associated with a storage repository for captured packet traffic and is associated with an index; and wherein each appliance includes a plurality of network interfaces used in execution of the capture processing along with processing of the CP messages; and
- a network tap appliance comprising a processor configured to:
  - obtain a current capacity of the repositories of the appliances of the ring;
  - alter a packet storage request from an initially designated repository in response to an initially designated current capacity; and
  - in cases of failing to obtain a second current capacity of a second repository, remove the second repository from an active packet forwarding designation list.

22. The system of claim 21, wherein the processor is further configured to:
- re-insert the second repository into the active forwarding designation list following receipt of a heartbeat from an associated appliance.

23. The system of claim 22, wherein the processor is further configured to:
- perform packet processing on packets stored in the second repository upon re-insertion of the second repository into the active forwarding designation list.

24. The system of claim 21, wherein the processor is further configured to:
- break a link between the network tap appliance and a last appliance of the ring;
- link a new appliance with the network tap appliance and the last appliance between respective ones of the plurality of network interfaces; and
- insert a respective forwarding designation of the new appliance into the active packet forwarding designation list.

25. The system of claim 21, wherein the processor is further configured to:
- transmit a CP search message to the appliances of the ring;
- receive relevant results from one or more of the appliances of the ring for a respective window of time retained by a respective one of the one or more of the appliances; and
- merge the received relevant results by concatenating each of the relevant results.

* * * * *